United States Patent
Paeth et al.

[11] Patent Number: 5,816,046
[45] Date of Patent: Oct. 6, 1998

[54] METHOD OF SUPRESSING VIBRATIONS OF AN ACTUATION ELEMENT OF A HYDRAULIC FORCE TRANSMISSION APPARATUS AND AUXILIARY VIBRATOR FOR CARRYING OUT THE METHOD

[75] Inventors: Karsten Paeth, Ebern; Helmut Rügheimer, Ebern-Gemund, both of Germany

[73] Assignee: Fahrzeugtechnik Ebern GmbH, Germany

[21] Appl. No.: 730,072

[22] Filed: Dec. 31, 1996

[51] Int. Cl.$^6$ .............................. F16D 25/12; F16L 55/04
[52] U.S. Cl. .................................. 60/469; 92/60; 192/30 V
[58] Field of Search ..................... 60/469, 413; 138/30; 192/30 V; 92/60

[56] References Cited

U.S. PATENT DOCUMENTS

| | | | |
|---|---|---|---|
| 3,581,773 | 6/1971 | Warren | 138/26 |
| 4,301,908 | 11/1981 | Fukuda | 192/30 V |
| 4,924,992 | 5/1990 | Romig | 192/30 V |
| 4,998,609 | 3/1991 | Nix et al. | 192/30 V |
| 5,070,983 | 12/1991 | Leigh-Monstevens et al. | 192/30 V |

FOREIGN PATENT DOCUMENTS

| | | |
|---|---|---|
| 29 38 799 A1 | 6/1980 | Germany . |
| 37 33 189 A1 | 4/1989 | Germany . |
| 1 562 709 | 3/1980 | United Kingdom ........ 192/30 V |
| 2 246 819 | 8/1990 | United Kingdom . |

*Primary Examiner*—Sheldon J. Richter
*Attorney, Agent, or Firm*—McAndrews, Held & Malloy, Ltd.

[57] ABSTRACT

A method of suppressing vibrations of an actuation element of a hydraulic force transmission apparatus, especially a hydraulic clutch actuation system in an automobile, and an auxiliary vibrator for carrying out the method, are disclosed. The force transmission apparatus possesses a transmitter cylinder connected to the actuation element, and also a receiver cylinder connected to that cylinder by a liquid column, by which receiver cylinder a low-frequency excitation vibration is transmitted to the liquid column, which propagates in the latter as a low-frequency pressure pulsation. According to the invention, the low-frequency pressure pulsation excites the auxiliary vibrator provided in the liquid column in such a manner that this vibrator vibrates with its intrinsic frequency, which is higher than the frequency of the low-frequency pressure pulsation, so that the auxiliary vibrator induces, in the liquid column, a higher-frequency pressure pulsation, which the vibratory system consisting of transmitter cylinder and actuation element cannot follow. The auxiliary vibrator possesses a freely vibrating diaphragm, which is clamped in a housing in order to form its base and/or top.

5 Claims, 8 Drawing Sheets

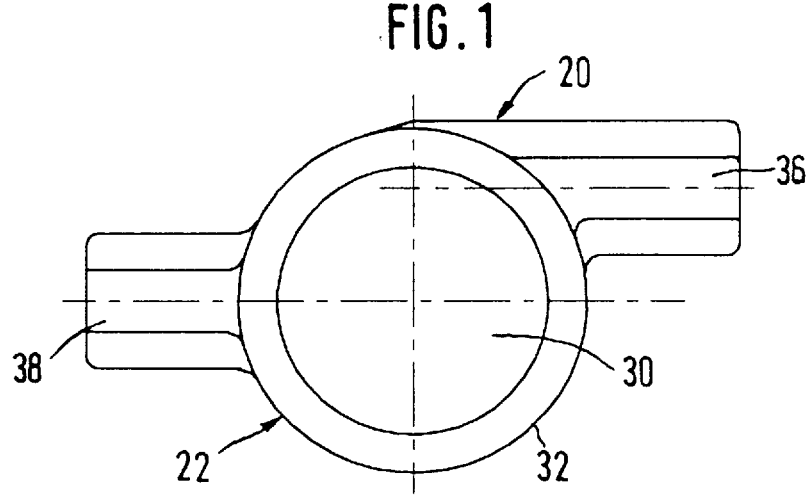
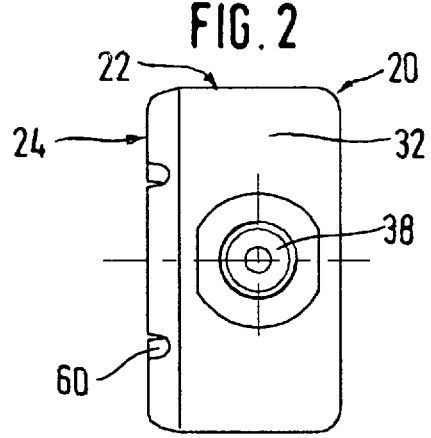
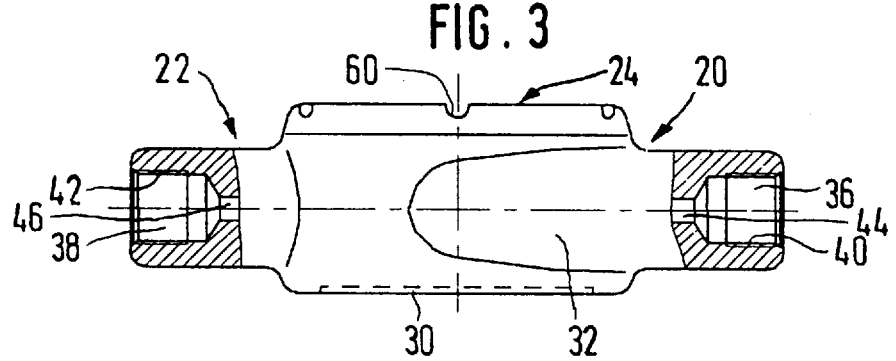

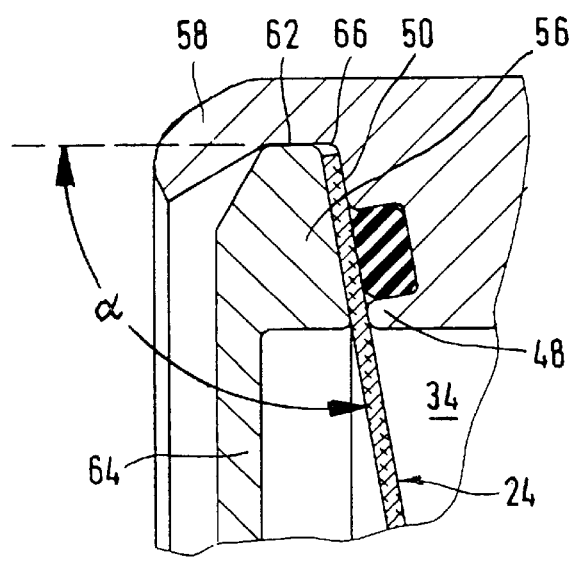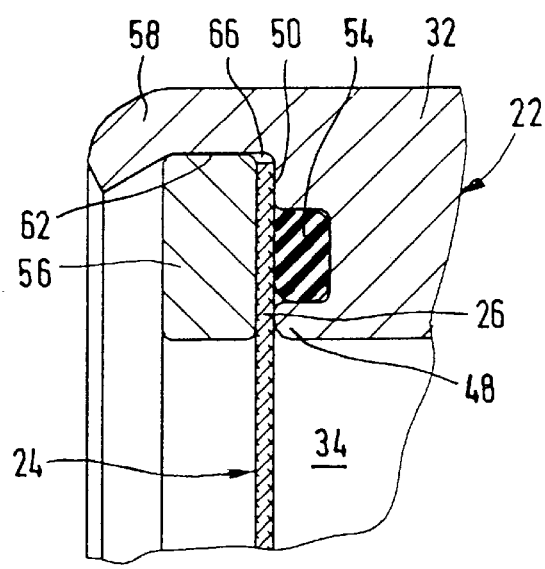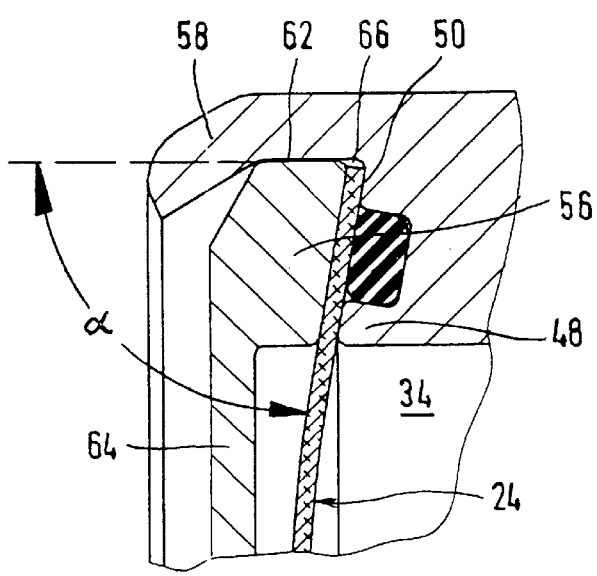

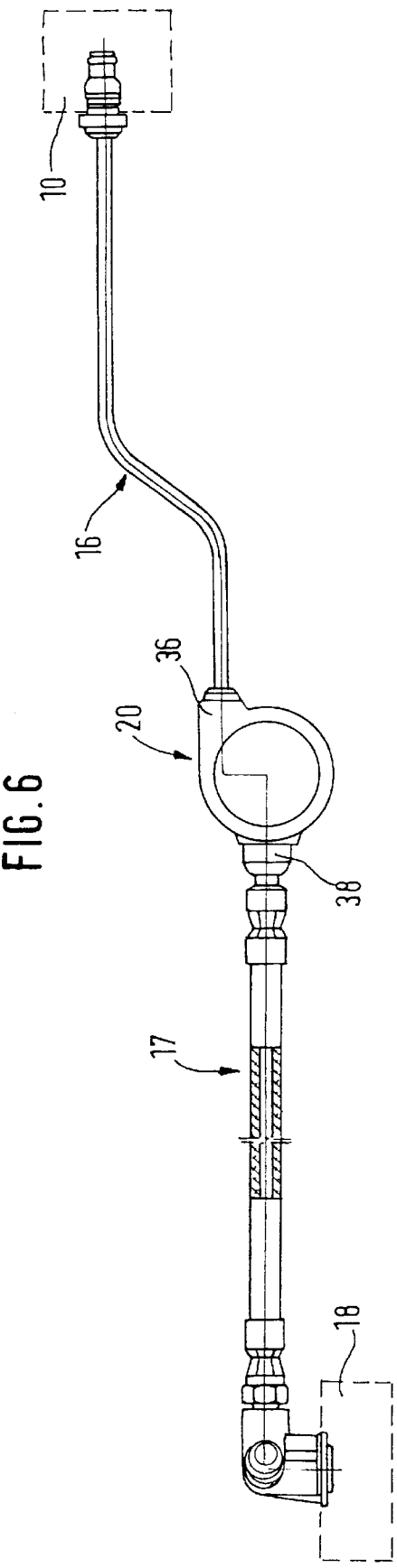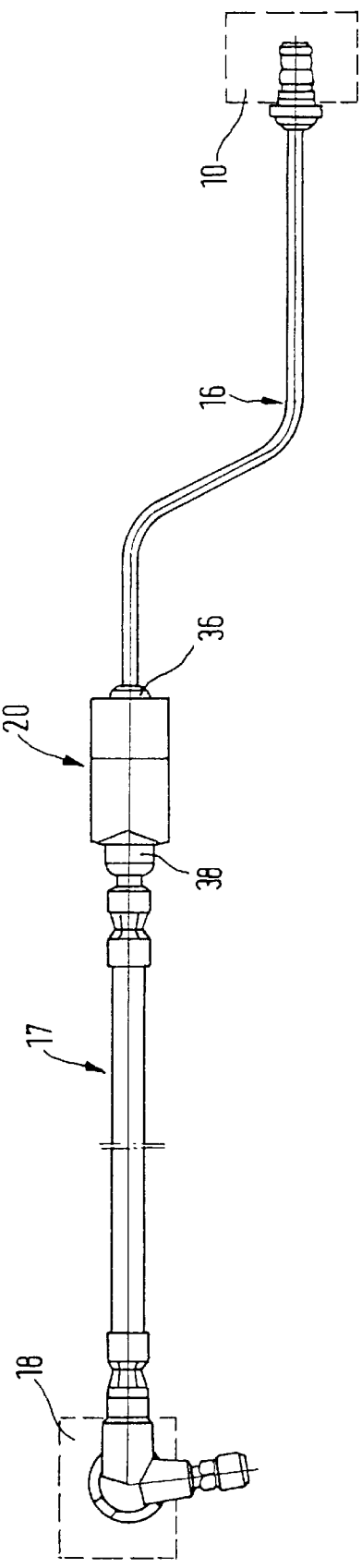

METHOD OF SUPRESSING VIBRATIONS OF AN ACTUATION ELEMENT OF A HYDRAULIC FORCE TRANSMISSION APPARATUS AND AUXILIARY VIBRATOR FOR CARRYING OUT THE METHOD

DESCRIPTION OF THE PRIOR ART

This invention relates to a method for suppressing vibrations of an actuating element of a hydraulic force transmission apparatus and to a device for carrying out this method. In particular, the invention relates to a method and a device for suppressing vibrations of the clutch pedal of a hydraulic clutch actuation system in an automobile.

FIG. 8 shows a conventional hydraulic clutch actuation system. A clutch actuation of this type has a transmitter cylinder 10, which is actuated via a clutch pedal 12 and is connected to a balancing vessel 14. The transmitter cylinder 10 is hydraulically connected by a pressure line 16 to a receiver cylinder 18, so that the pressure generated in the transmitter cylinder 10 by pressing down the clutch pedal 12 can be transmitted via the liquid column in the pressure line 16 to the receiver cylinder 18. As a result, the release bearing of the clutch 19 is loaded by the receiver cylinder 18 with an actuating force, in order to separate the clutch pressure plate from the clutch entraining disc by means of a disengagement mechanism and thus to separate the internal combustion engine from the gearbox of the vehicle.

In clutch actuation systems of this type, the problem arises that vibrations are transmitted from the internal combustion engine, via the clutch pressure plate, the release mechanism, the release bearing and the liquid column in the pressure line 16 between the receiver cylinder 18 and the transmitter cylinder 10, to the clutch pedal 12, so that the clutch pedal 12 vibrates noticeably for the driver when he presses down to release the clutch. The vibrations at the receiver cylinder 18 are transmitted here via the liquid column in the pressure line 16 as pressure pulsations to the transmitter cylinder 10.

For solving this problem it has been proposed, as illustrated in FIG. 8, to form at least a portion of the pressure line 16 as a volume-accommodating hose 16A, for example of rubber, in order to damp the pressure pulsations in the liquid column between the receiver cylinder 18 and the transmitter cylinder 10 by means of the elastic properties of the hose 16A.

Additional flow resistors in the form of throttles or baffle plates in the pressure line between receiver cylinder and transmitter cylinder have also been provided for improving the damping action of damping devices of this type.

Thus, for example, DE 29 38 799 A1 describes a vibration damper, which is to be mounted in the pressure line between receiver cylinder and transmitter cylinder. The vibration damper comprises a pressure fluid chamber connected to the receiver cylinder and the transmitter cylinder. In the pressure fluid chamber, a piston for absorbing the pressure fluctuations is disposed, which is displaceable transversely to the pressure line against the force of a rubber spring. For amplifying the damping effect, baffles are disposed at the inlet and outlet ends of the pressure fluid chamber, which create a pressure drop between them.

A common feature of the above-described damping devices is that they operate on the so-called absorption principle.

According to this damping principle, the pressure pulsations are damped by volume increase, i.e., for the above examples, expansion and springing back of a volume-accepting rubber hose or compression and springing back of a rubber spring. The pressure pulsation is thus converted partly into heat energy by the internal friction in the rubber, so that energy is removed from it.

There are relatively narrow limits to this type of damping of pressure pulsations, however, because the volumetric increase is accompanied by undesired clutch disengagement losses, which when the clutch pedal is actuated are noticeable to the driver, in particular, as softness of the clutch actuation, increase of stroke at the clutch pedal and lack of pressure point.

Moreover, especially in cold conditions, because of the flow resistances of the throttles or baffles provided, increased dynamic pedal forces with rapid actuation and reduced pedal restoring speeds occur.

It has, also, been found in practice that with this type of damping, although indeed vibrations of higher frequencies f (f>250 Hz) can be effectively eliminated, low-frequency components however are scarcely reduced. This fact can lead to problems especially when the clutch pedal is excited by the remaining low-frequency vibration components in the region of its intrinsic frequency. This can be explained more fully with reference to FIG. 9, which shows the amplitude y of a damped vibratory system as a function of the angular frequency ω of the exciting force.

If the clutch pedal together with the transmitter cylinder is imagined as a damped vibratory system, then the amplitude of this vibrator can be described mathematically as follows:

$$\hat{y} = \frac{\hat{F}_E}{\sqrt{m^2(\omega_0^2 - \omega^2)^2 + \beta^2\omega^2}}.$$

where the symbols have the following meanings:

$\hat{y}$ : amplitude of the vibrating system,

FE : maximum value of the excitation force (FE=p× AGZ), p, AGZ : maximum pressure at and area of the transmitter cylinder, ωo : intrinsic frequency (resonance frequency) of the undamped vibrator, ω : angular frequency of the excitation force, m : mass of the vibrator, β : damping constant and δ : decay constant (δ=β/2m).

With a predetermined excitation force FE, and damping constant β, the amplitude ŷ of the vibrating system is only a function of the excitation frequency ω. As can be clearly seen from FIG. 9, the amplitude ŷ of the vibrating system reaches especially high values when the excitation frequency ω approaches the intrinsic frequency ωo of the vibrator (the resonance case). As parameter for the individual amplitude curves in FIG. 9, the decay constant δ was used. For very small decay constants δ, the amplitude ŷ increases with excitation in the vicinity of the intrinsic frequency ωo beyond all measure, to decrease again largely independently of the damping with increasing excitation frequency ω. Even at an excitation frequency of approx. ω=3×ωo, the oscillations of the vibrator become negligibly small.

To summarise, it may be stated that, in the above described state of the art, strong vibrations of the clutch pedal occur when the vibratory system consisting of clutch pedal and transmitter cylinder is excited in the region of its intrinsic frequency by low-frequency components of the pressure pulsation in the pressure line between receiver cylinder and transmitter cylinder.

To counteract the above indicated problem, it has been proposed according to U.S. Pat. No. 49 24 992, to dispose in the pressure line between receiver cylinder and transmitter cylinder a damper box and a volume-absorbing hose in series. The damper box comprises a cavity, which is bounded axially by two circular wall portions spaced at a specific distance from each other, while it is bounded radially by an annular wall portion having a predetermined diameter. In the centre of the one circular wall portion of the damper box, a first connection is provided, by which the cavity is connected to the receiver cylinder. At the annular wall portion of the damper box, furthermore, a second connection is provided, by which the cavity is connected to the transmitter cylinder with the volume-accommodating hose intermediate between them.

The damper box according to this state of the art operates on the so-called interference or reflection principle. Interference or reflection dampers operate in principle in such a way that the perturbing primary wave is extinguished by the superposition of a second wave of the same amplitude and frequency, the second wave being phase-displaced from the first by one half-wavelength.

In the specific case of the solution proposed in U.S. Pat. No. 49 24 992, the pressure pulsation enters through the first connection into the cavity of the damper box, from where it propagates as a pressure wave radially outwards, meets the opposite, circular wall portion and also the annular wall portion and is reflected back by them. By the phase displacement between the entering pressure waves and the pressure waves reflected from the wall portions, the pressure waves in the cavity of the damper box partly cancel one another out.

This type of damping is highly frequency-dependent, that is to say it is effective only within a small frequency spectrum, so that a sufficient damping of the vibratory system consisting of clutch pedal and transmitter cylinder, for example, cannot be achieved in all its resonance ranges. Furthermore, the problems sketched out above in connection with the volumetric increase occur in a series circuit of damper box and volume-accommodating hose.

Finally, for vibration damping, a diaphragm damper box has been proposed according to DE 37 33 189 A1, which can be disposed in the pressure line between receiver cylinder and transmitter cylinder. The diaphragm damper box has a pot-shaped housing, into which a lid is screwed, which was connected to the housing by subsequent flanging. The lid possesses two pipe connections extending axially of the housing, by which a pressure fluid chamber of the diaphragm damper box can be connected to the receiver cylinder and transmitter cylinder respectively. In the base region of the housing, a diaphragm is disposed, which encloses together with the base of the housing a relatively small air chamber, while together with the lid it defines the pressure fluid chamber. The diaphragm consists of a hardened and annealed spring steel disc, to enable it to withstand the relatively high pressures in hydraulic systems, and is firmly clamped at the edge with the intermediary of a seal, but movable in the centre in the axial direction of the housing.

In so far as the already known diaphragm damper box operates by compression and expansion of the gas volume in the air chamber in the bottom region of the housing according to the absorption principle, the above-described problems, associated with the volumetric increase, occur, while the action of the diaphragm damper box, as interference and reflection damper, is subjected to the above-described limits.

SUMMARY OF THE INVENTION

Compared with the state of the art, therefore, the objective of the present invention is to create a method and a device, by means of which vibrations of an actuating element of a hydraulic force transmission apparatus can be effectively suppressed, while the suppression of the vibrations does not act adversely in the actuation of the actuating element.

According to one aspect of the present invention, there is provided a method of suppressing vibrations of an actuating element of a hydraulic force transmission apparatus, especially a hydraulic clutch actuation system in an automobile, which comprises a transmitter cylinder connected to an actuation element, which cylinder forms, together with the actuation element, a vibratory system, and also a receiver cylinder, connected via a liquid column to the transmitter cylinder, through which a low-frequency excitation vibration is transmitted to the liquid column, which propagates in the latter as low-frequency pressure pulsation, characterised in that the low-frequency pressure pulsation excites an auxiliary vibrator, provided in the liquid column, in such a manner that the vibrator vibrates with its intrinsic frequency, which is higher than the frequency of the low-frequency pressure pulsation, so that the auxiliary vibrator induces, in the liquid column, a high-frequency pressure pulsation, which the vibratory system consisting of transmitter cylinder and actuation element cannot follow.

According to a second aspect of the present invention, there is provided an auxiliary vibrator for carrying out the method as just defined comprising a housing, a base and/or top which is formed by a freely vibrating diaphragm, an edge of which is firmly clamped to the housing and which bounds, together with the housing, a chamber which can be connected via pipe connections to the transmitter cylinder and to the receiver cylinder of the hydraulic force transmission apparatus, so that the diaphragm can be loaded by the liquid column between transmitter cylinder and receiver cylinder.

In operation, the diaphragm of the auxiliary vibrator is loaded by the liquid column between transmitter cylinder and receiver cylinder, so that the diaphragm is excited to vibrations by the low-frequency pressure pulsation in the liquid column. Since the intrinsic or natural frequency of the auxiliary vibrator is higher than the frequency of the low-frequency pressure pulsation, the diaphragm vibrates between the individual pressure pulses of the low-frequency pressure pulsation with the intrinsic frequency of the auxiliary vibrator and thus induces the higher-frequency pressure pulsation in the liquid column. The deflection movement of the diaphragm is so small that the auxiliary vibrator has only a minimal volume absorption, which in the case of use of a hydraulic clutch actuation is not noticeable to the driver at the clutch pedal.

By the incorporation of the auxiliary vibrator, therefore, the pressure amplitudes of the pressure pulsation induced by the receiver cylinder in the liquid column are not damped, but the frequency of the excitation vibration is modulated in such a manner and the exciting vibration is displaced in such a manner into higher-frequency ranges that, at the output from the auxiliary vibrator and at the transmitter cylinder, a higher-frequency vibration occurs. The vibratory system consisting of transmitter cylinder and actuating element or clutch pedal cannot follow this higher-frequency vibration because of its inertia and therefore remains at rest.

The intrinsic frequency of the auxiliary vibrator that is determining for the increase of the frequency of the excitation vibration at the transmitter cylinder can be simply adjusted by appropriate choice of the material of the diaphragm, of the thickness and diameter of the diaphragm, of the area of the freely vibrating region of the diaphragm, of the type of clamping of the diaphragm to the housing and of the volume of the chamber of the auxiliary vibrator.

By reference to the physical and mathematical relationships described above with reference to FIG. 9, it becomes apparent that, even at a frequency of the excitation vibration at the transmitter cylinder, increased by approximately three times, the pedal vibrations can be reduced to a scarcely detectable level. It will be self-evident that the auxiliary vibrator and the intrinsic frequency of the auxiliary vibrator, however, must be tuned individually to the particular hydraulic force transmission device, for example the hydraulic clutch actuation system of a specific automobile model. This is attributable to the fact that, in different hydraulic force transmission apparatuses, different forms of vibration also occur, due for example to different system-inherent excitation frequencies and/or intrinsic frequencies. It may, for example, also be necessary to adapt the stiffness of the diaphragm to the system pressure, in order that the diaphragm shall still possess sufficient elasticity, even at maximum pressure loading, to be able still to execute sufficiently large vibrations when excited by a relatively weak pressure pulsation.

According to another aspect of the present invention, the housing of the auxiliary vibrator is substantially annular or pot-shaped, and the connections for the transmitter cylinder and the receiver cylinder pass through the annular wall of the housing. By this form of construction of the housing assurance is provided in advantageous manner that the auxiliary vibrator, when the hydraulic force transmission device is actuated, does not impede a displacement of the liquid column, while the higher-frequency pressure pulsation in the liquid column is introduced over a large area. Manufacturing advantages also arise, because the rough for the housing can be produced by extrusion and a subsequent machining of the connections can be easily carried out.

Since, according another aspect of the present invention, the connection for the transmitter cylinder leads tangentially into the chamber, whereas the connection for the receiver cylinder leads radially into the chamber, a trouble-free venting of the chamber to the transmitter cylinder is possible in simple manner. As a result, the intrinsic frequency of the auxiliary vibrator can reliably be prevented from displacing in undesired manner by further elasticities or reduced masses in the form of air bubbles in the chamber.

BRIEF DESCRIPTION OF THE DRAWINGS

FIG. 1 a front view of a preferred example of embodiment of the auxiliary vibrator according to this invention, FIG. 2 the auxiliary vibrator according to FIG. 1, in a side view from the left, FIG. 3 the auxiliary vibrator according to FIG. 1, in plan, the connections of the auxiliary vibrator being shown cut away, FIG. 4 a section through the auxiliary vibrator according to FIG. 1, the connections of the auxiliary vibrator being shown in alignment for simplicity, FIGS. 5A, 5B and 5C various possible ways of clamping the diaphragm to the housing of the auxiliary vibrator (detail A in FIG. 4), FIG. 6 a front elevation of an auxiliary vibrator according to this invention, which is connected between the pressure lines leading to the receiver and transmitter cylinders respectively, FIG. 7 the connected auxiliary vibrator according to FIG. 6, in plan, FIG. 8 a conventional hydraulic clutch actuation system with a volume-absorbing hose, FIG. 9 the amplitudes of a damped vibratory system as a function of the angular frequency of the excitation force, for illustrating the understanding of the resonance vibration, FIG. 10 the pedal acceleration aP, the pressure PN at the receiver cylinder and the pressure PG at the transmitter cylinder of a conventional hydraulic clutch actuation system as a function of time, FIG. 11 the pedal acceleration aP, the pressure PN at the receiver cylinder and the pressure PG at the transmitter cylinder of a hydraulic clutch actuation system with auxiliary vibrator according to this invention, as a function of time, FIGS. 12A and 12B the pedal acceleration aP, the pressure PN at the receiver cylinder and the pressure PG at the transmitter cylinder of a conventional hydraulic clutch actuation system as a function of frequency, and FIGS. 13A and 13B the pedal acceleration aP, the pressure PN at the receiver cylinder and the pressure PG at the transmitter cylinder of a hydraulic clutch actuation system with auxiliary vibrator according to this invention, as a function of frequency.

Figure 4:
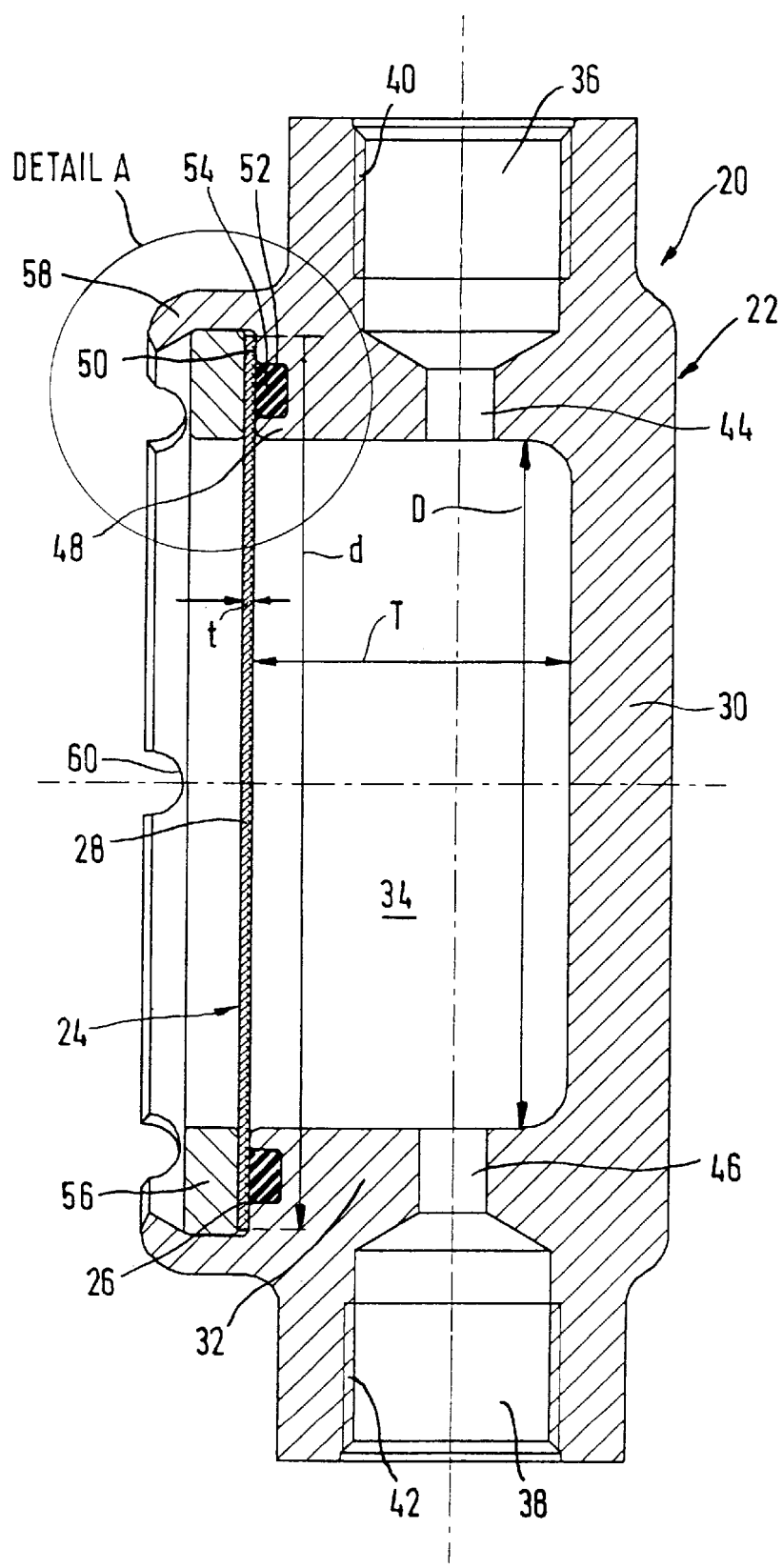
Figure 8:
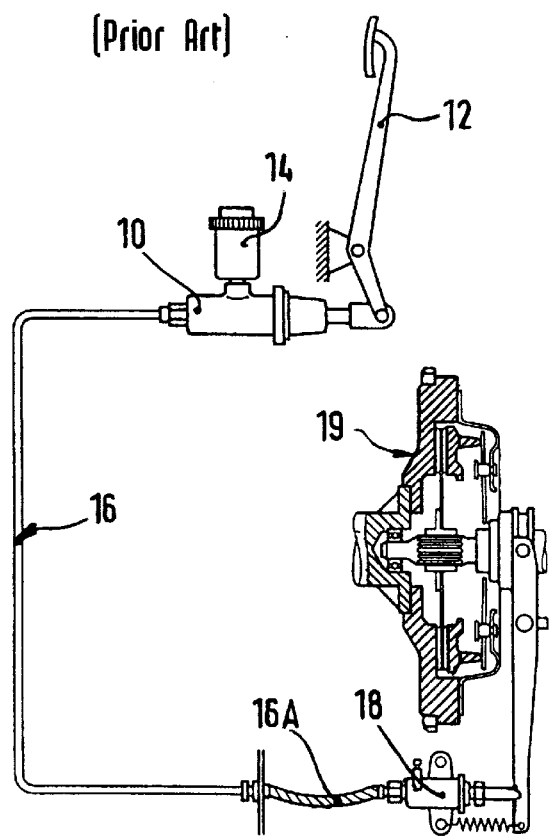
Figure 9:
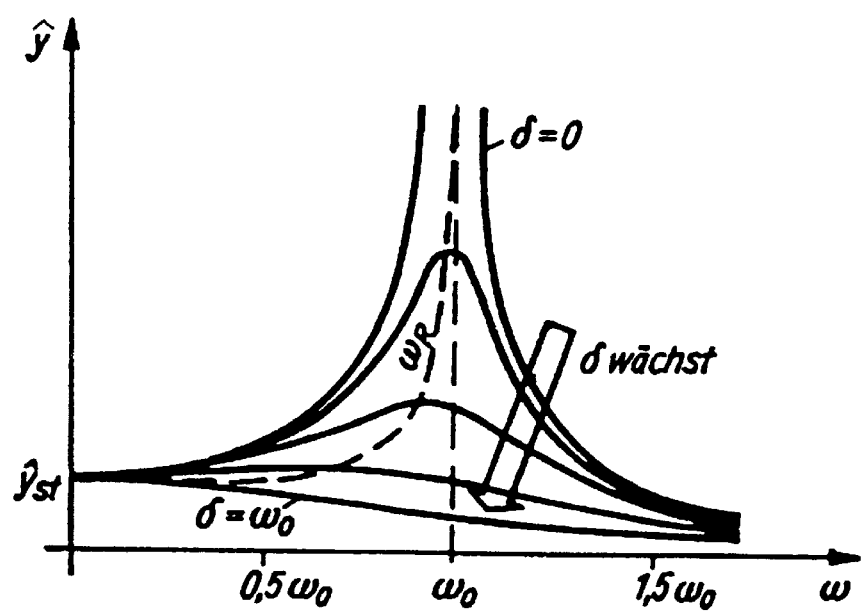

According to FIGS. 1 to 4, an auxiliary vibrator 20 according to the invention has a basically pot-shaped housing 22, the lid of which is formed of a diaphragm 24, preferably of spring steel. The diaphragm 24 is clamped by its edge 26 firmly to the housing 22, while the central region 28 of the diaphragm 24 can freely vibrate. The diaphragm 24, together with a base 30 and an annular wall 32 of the housing 22, bounds a chamber 34. The annular wall 32 of the housing 22 is perforated by connections 36, 38 to the chamber 34, through which the auxiliary vibrator 20 can be connected to a transmitter cylinder 10 and a receiver cylinder 18 of a hydraulic force actuation device (FIGS. 6 and 7), so that the diaphragm 24 can be loaded by the liquid column between transmitter cylinder 10 and receiver cylinder 18.

The pipe connections 36, 38 of the housing 22 each have a threaded zone 40, 42, by which the pressure line 16 leading to the transmitter cylinder 10 and the receiver cylinder 18 respectively can be screwed to the auxiliary vibrator 20. Towards the chamber 34, the connections 36, 38 taper conically and each continue into a cylindrical end portion 44, 46. Although not illustrated in FIGS. 3 and 4, the cylindrical end portion 44 of the connection 36 for the transmitter cylinder 10 leads tangentially into the chamber 34, whereas the cylindrical end portion 46 of the connection 38 for the receiver cylinder 18 leads radially into the chamber 34. By this arrangement of the connections 36, 38, a good self-venting of the chamber 34 towards the transmitter cylinder 10 is assured, so that no air bubbles remain in the chamber 34 which could interfere with the functioning of the auxiliary vibrator 20.

Having regard to a sufficient vibration excitation of the diaphragm 24 by a suitable propagation of the pressure pulsation in the chamber 34, it is basically advantageous if the centre-lines of the connections 36, 38 are offset in height and/or laterally from each other. Otherwise, i.e. if the connections 36, 38 were in alignment with each other, the risk would exist that the pressure pulsation could travel virtually through the chamber 34, without sufficiently exciting the diaphragm 24.

As can be seen in particular from FIG. 4, the annular wall 32 of the housing 22 possesses a radially inwardly situated shoulder 48, against the side face 50 of which the diaphragm 24 bears. In the side face 50, an annular groove 52 is formed, which houses a seal 54 (O-ring), which seals the chamber 34 against the outside.

The diaphragm 24 is pressed by means of a ring 56 against the face 50 of the shoulder 48. For this purpose, the internal diameter of an annular portion 58 of the annular wall 32 of the housing 22, remote from the shoulder 48, is so chosen that it is somewhat larger than the diameter d of the diaphragm 24, while the external diameter of the ring 56 is so chosen that it can be fitted closely into the annular portion 58, before the ring 56 is connected to the housing 22. Furthermore, the annular portion 58 has a relatively thin wall thickness and is provided, at its edge face, with a plurality of notches 60, so that the ring 56 can be peened onto the housing 22. This peened condition can clearly be seen from FIG. 4, which shows the inwardly bent-over annular portion 58. The ring 56 could, however, also be connected to the housing 22 by other suitable connection techniques, for example a screwed connection, in order firmly to clamp the diaphragm 24 to the housing 22.

FIGS. 5A to 5C show various possible ways of clamping the diaphragm 24 to the housing 22, FIG. 5B illustrating the detail A of FIG. 4 in enlarged view. According to this clamping facility of the diaphragm 24, the face 50 of the shoulder 48 makes an angle of 90° with the inner circumferential surface 62 of the annular portion 58, so that the diaphragm 24 is clamped flat. With such a type of clamping, the diaphragm 24 is relatively soft under pressure loading, so that a small volumetric absorption in the chamber 34 can be caused by the pressure pulsation as the diaphragm 24 is excited to vibrate. This small volumetric absorption in the chamber 34 is, for a predetermined thickness t (FIG. 4) of the diaphragm 24, greater than with the clamping possibilities illustrated in FIGS. 5A and 5C.

According to FIG. 5A, the face 50 of the shoulder 48 makes an obtuse angle α with the inner circumferential surface 62 of the annular portion 58 and the housing 22, so that the diaphragm 24 bulges inwards, i.e. is concavely clamped. With this type of clamping, the diaphragm 24 is very stiff, i.e. the diaphragm 24 offers a relatively high resistance to the pressure pulsation during pressure loading. The angle α is only a few degrees greater than 90°, so that the diaphragm 24, on the one hand has sufficient elasticity to be able to vibrate, but on the other hand is so stiff that the volumetric absorption in the chamber 34 can be minimized.

According to FIG. 5C, the face 50 of the shoulder 48 makes an acute angle α with the inner circumferential surface 62 of the annular portion 58 and the housing 22, so that the diaphragm 24 bulges outwards, i.e. is convexly clamped. As a result of the fact that the angle α is a few degrees smaller than 90°, there is also an increased stiffness in the diaphragm 24, with minimized volumetric absorption in the chamber 34.

Since, for the clamping methods illustrated in FIGS. 5A and 5C for the diaphragm 24, higher clamping forces are necessary than with the clamping method according to FIG. 5B, in order to counteract the elastic forces of the deformed diaphragm 24, there is a risk that the ring 56 may be deformed. Therefore, the ring 56 is, in these clamping methods, provided with a radially inwardly extending ring disc portion 64, which increases the bending stiffness of the ring 56, but otherwise does not impede a free vibration of the central zone 28 of the diaphragm 24.

In other respects, for the clamping methods illustrated in FIGS. 5A to 5C for the diaphragm 24, it is a common feature that a transition zone 66 between the face 50 of the shoulder 48 and the internal circumferential surface 62 of the ring portion 58 is preferably formed as an oblique or conical surface, which makes an angle of 150° with the internal circumferential surface 62 of the ring portion 58, i.e. in the case of FIG. 5B an angle of 120° with the face 50 of the shoulder 48, while the edge 26 of the diaphragm 24 in the assembled state of the diaphragm 24 is spaced radially inwards by a predetermined distance from the oblique surface, i.e. does not bear against the oblique surface. By this form of construction of the transition zone 66, a lasting and crack-free clamping of the diaphragm 24 to the housing 22 is possible.

Apart from the possibility of adjusting the intrinsic frequency of the auxiliary vibrator 20 by suitable choice of material for the diaphragm 24, by which the elastic properties of the diaphragm 24 can be changed, the intrinsic frequency of the auxiliary vibrator 20 can also be tuned by appropriate choice of the clamping angle α of the diaphragm 24, individually to the particular force transmission apparatus. This has the advantage that, with the same housing 22 and same diaphragm 24, only the shoulder 48 and its face 50 need to be of different form, in order to adjust the desired clamping angle α and thus suitably tune the intrinsic frequency. As a result, a unit composed system for auxiliary vibrators 20 can easily be set up.

A further possible manner of tuning the natural frequency of the auxiliary vibrator 20 consists in making the diaphragm 24 of a different thickness. The ratio of the thickness t (FIG. 4) of the diaphragm 24 to the diameter d of the diaphragm 24 must satisfy a predetermined relationship, so that a suitable vibrational capability of the diaphragm 24 accompanied by sufficient stiffness is achieved. It has been found that the ratio of the diameter d of the diaphragm 24 to the thickness t of the diaphragm 24 should preferably be greater than or equal to 45.

Finally, the intrinsic frequency of the auxiliary vibrator 20 can be tuned by modifying the volume of the chamber 34 and thus the area of the vibratory central region 28 of the diaphragm 24. With this type of design of the auxiliary vibrator 20, care should be taken to ensure that the auxiliary vibrator 20 remains easily handled in view of its size and weight, that sufficient space is available for forming the pipe connections 36, 38, and that the housing 22 has an adequate wall thickness to provide suitable strength for the pressures that will occur. It has been found in this respect that the ratio of the diameter D (FIG. 4) of the chamber 34 to the depth T of the chamber 34 should preferably be greater than or equal to 1.5.

As material for the hosing 22, aluminium malleable alloy is especially suitable, which will possess good deformation properties so that the rough for the housing 22 cart be economically produced by extrusion. This method presents itself in the example of embodiment illustrated, because the connections 36, 38 pass through the annular wall 32 of the housing 22 i.e. extend radially of the housing 22. Furthermore, this construction and arrangement of the connections 36, 38 makes possible a favourable manufacturing method by chip-removal of the housing 22, for constructing the connections 36, 38.

Although in the example illustrated, only one diaphragm is provided, the auxiliary vibrator according to the invention may also have two diaphragms which, similarly to a drum, form the base and lid of the housing. The clamping of the diaphragms to the housing takes place in this case analogously to the above-described example.

FIGS. 6 and 7 show the auxiliary vibrator 20 incorporated into a hydraulic force transmission apparatus, the transmitter cylinder 10 and the receiver cylinder 18 of the force transmission apparatus being indicated only schematically.

In the case shown, the connection pipe 36 of the auxiliary vibrator 20 is connected to the transmitter cylinder 10 by a purely metallic pipeline 16, while the connection pipe 38 of the auxiliary vibrator 20 is connected by a relatively stiff coupling hose 17 to the receiver cylinder 18. Only purely metallic pipelines could equally well be used, however, for connecting the receiver cylinder 18 and the transmitter cylinder 10 to the auxiliary vibrator 20.

When incorporating the auxiliary vibrator 20 into the hydraulic force transmission apparatus, attention should be paid to the auxiliary vibrator 20 being disposed as near as possible to the transmitter cylinder 10, in order to keep the damping that occurs with increasing pipeline length of the pressure pulsation of higher frequency induced in the liquid column by the auxiliary vibrator 20 as low as possible.

A preferred field of application for the method and auxiliary vibrator according to this invention comprises hydraulic clutch actuation systems in automobiles, the frequency of the excitation vibration at the receiver cylinder being equal to the ignition frequency of the internal combustion engine. The invention can equally well be used, however, in any other hydraulic force transmission apparatus containing a transmitter cylinder and receiver cylinder, in which vibrations are introduced via the receiver cylinder into the liquid column and vibrations of the actuating element connected to the transmitter cylinder should be suppressed.

FIGS. 10 to 13B show the results of a comparative investigation of a conventional clutch actuation system with volume-accommodating hose and also additionally installed baffles (FIG. 10, 12A and 12B) and a clutch actuation system with vibration suppression according to this invention (FIG. 11, 13A and 13B), i.e. with incorporated auxiliary vibrator which, amongst other things, fulfils the above claimed condition that the ratio of the diameter of the diaphragm to the thickness of the diaphragm is greater than or equal to 45.

In the comparative investigation, the two clutch actuations were tested on an engine test bed with a four-stroke otto engine of four-cylinder in-line type, which had a swept volume of 1.6 litre and was operated at a constant rotational speed of 4700 r.p.m. The pressure PG at the transmitter cylinder and the pressure PN at the receiver cylinder were each plotted as the clutch pedal was actuated, and the acceleration ap of the clutch pedal was measured.

Figure 11:
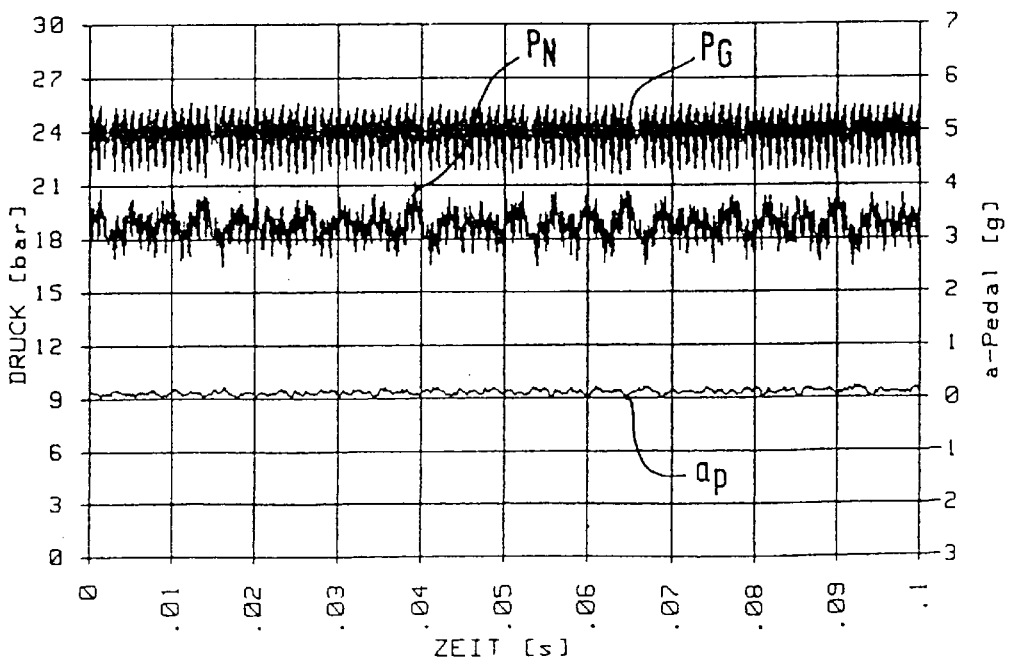
Figure 12A:
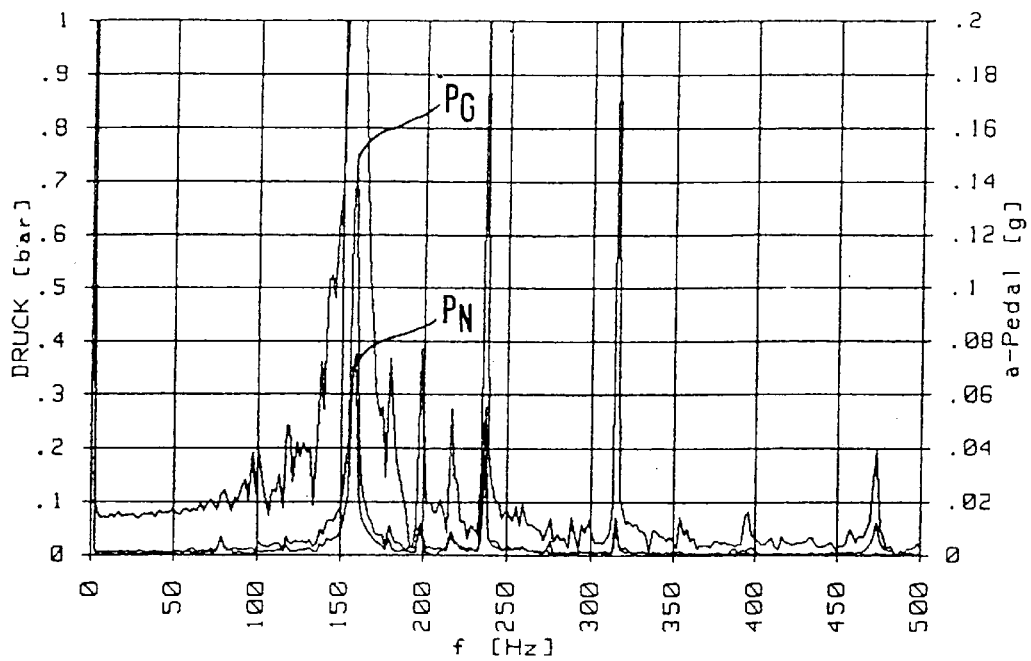
Figure 12B:
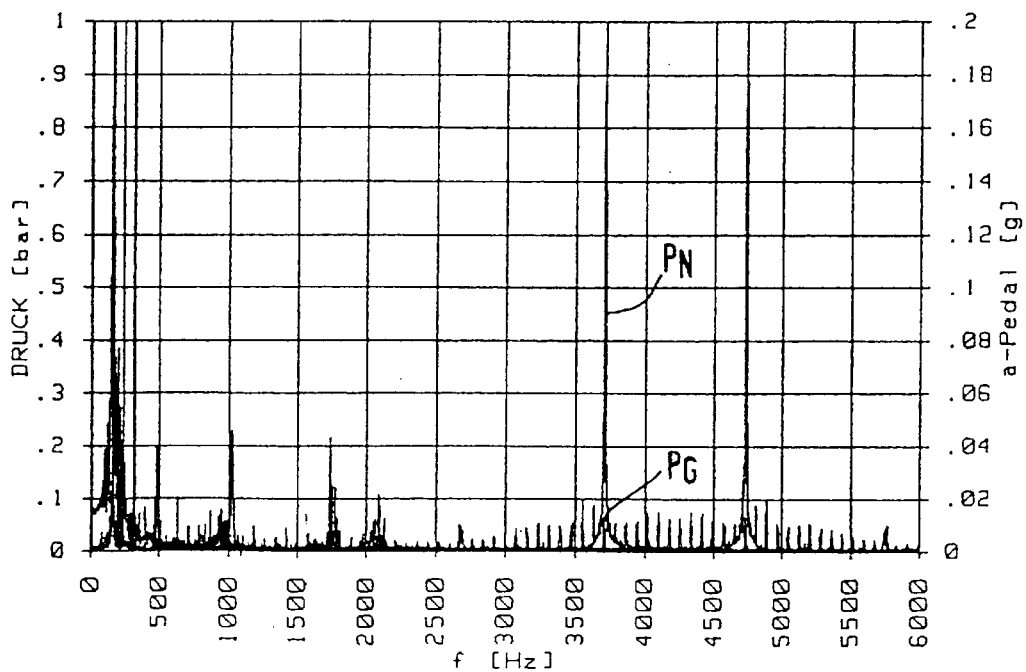
Figure 13A:
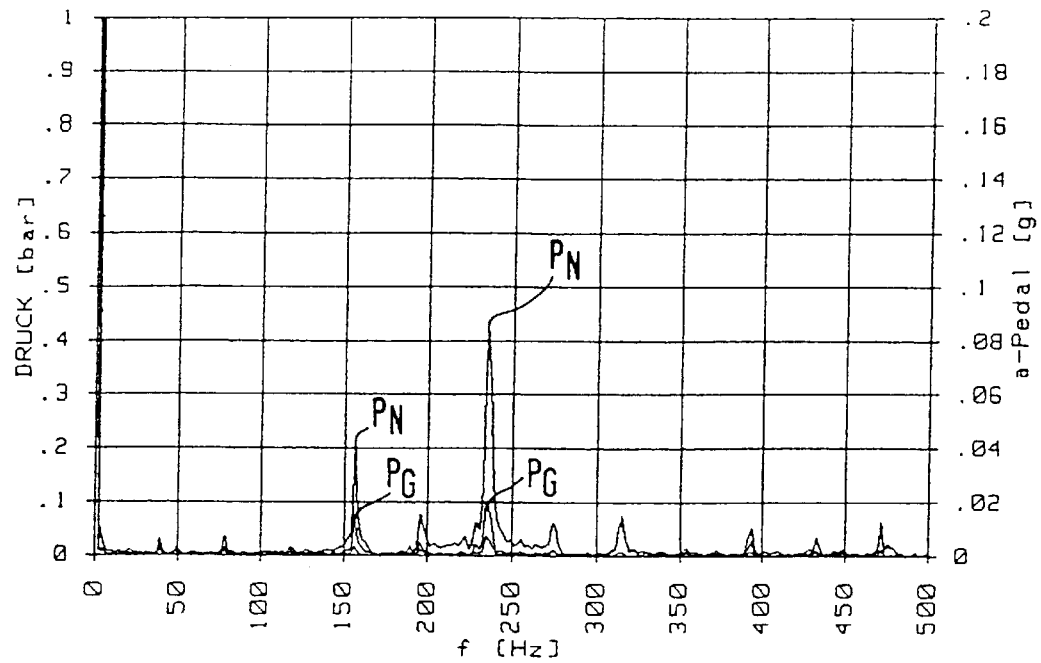
Figure 13B:
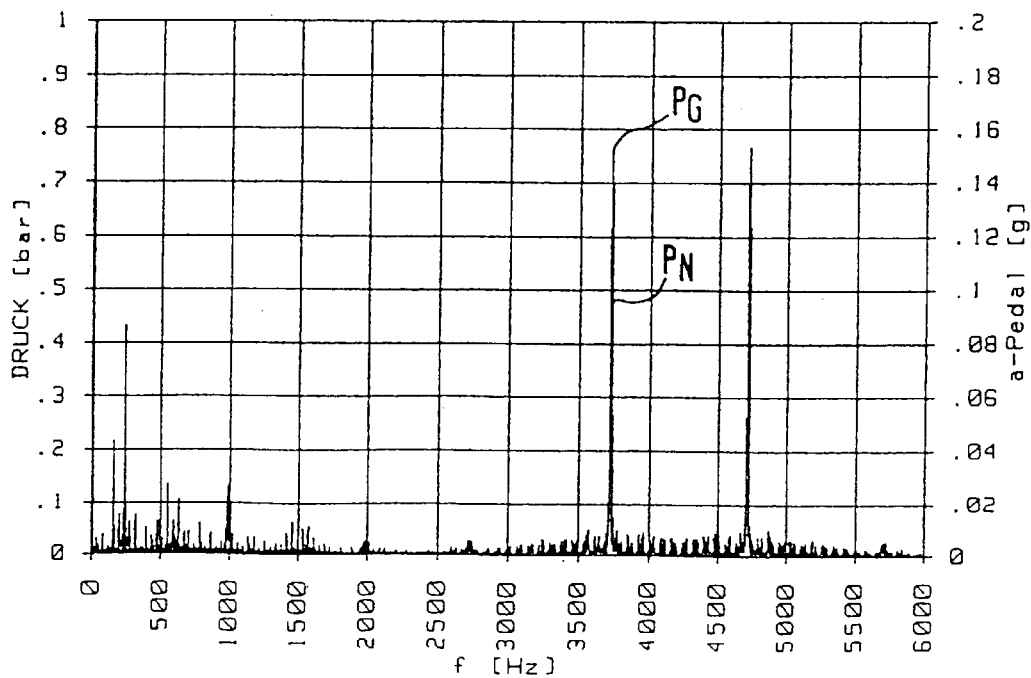

The measured results were plotted as a function of time (FIG. 10 and 11) and as a function of frequency (FIG. 12A to 13B). FIGS. 12B and 13B show the frequency range from 0 to 6 KHz, while FIGS. 12A and 13A each show only the frequency range from 0 to 500 Hz.

Figure 10:
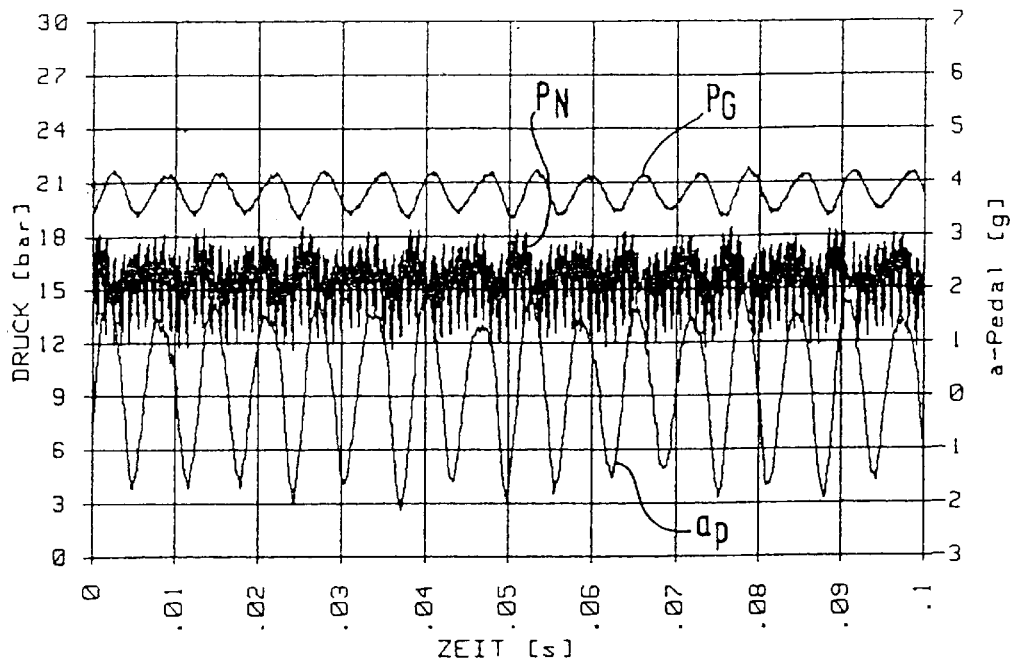

From FIG. 10, the vibration behaviour of the conventional clutch actuation system can be deduced, the pressure PG at the transmitter cylinder being shown displaced by +5 bar, so that the differences in the form of the pressure PN at the receiver cylinder become clear.

In the conventional clutch actuation, the pressure pulsation PG at the transmitter cylinder consist mainly of a harmonic vibration having the frequency 157 Hz (FIG. 12A), while the pressure pulsation PN at the receiver cylinder has superposed high-frequency components (FIG. 12B). These high-frequency components are largely eliminated by the volume-absorbing hose and the additionally installed baffles, so that they reach the transmitter cylinder damped (FIG. 12B). The remaining low-frequency components of the pressure pulsation PG at the transmitter cylinder generate strong vibrations at the clutch pedal, in spite of their relatively low amplitude of approx. 1.5 bar (FIG. 10). The measured values for the pedal acceleration ap of up to 2 g (FIG. 10) are clearly felt by the driver and in no way are acceptable.

Since the excitation frequency of the pressure pulsation PG at the transmitter cylinder here corresponds approximately to the intrinsic frequency of the vibratory system consisting of transmitter cylinder and clutch pedal, a clear attenuation of the vibrations of the clutch pedal cannot be achieved, even by a stronger damping—for example by a softer volume-absorbing hose. This measure would also further increase the above-described, undesired disengagement losses of the conventional clutch actuating systems, caused by the volume absorption.

It has furthermore been found that the vibrations in t he range of about 300 Hz to 500 Hz in the actuated state of the clutch actuation, i.e. with the clutch pedal held down, and the engine running, give rise to humming noises. These noises can arise from the running engine and/or from the transmitter or receiver cylinders and also their connection to the chassis components and from the latter themselves. In this connection, it has also been found that the above-described vibration of the clutch pedal and the noise generation are not necessarily associated with one another, but can occur independently of each other as a function of vehicle-specific parameters.

A vibration of this type, generating undesired noise, can be seen in FIG. 12A, for example, at a frequency of approx. 320 Hz with an amplitude height of up to 0.2 g.

Finally, the vibrations shown in FIG. 12B above 500 Hz, for example at 3700 Hz, are not noticeable in the form of vibrations of the clutch pedal, nor as noise.

From FIG. 11 the vibration behaviour of the clutch actuation system with vibration suppression according to this invention can be deduced, wherein the pressure PG at the transmitter cylinder has also been shown displaced by +5 bar, so that the differences from the form of the pressure PN at the receiver cylinder become clear. Furthermore, the pedal acceleration ap is shown displaced by +0.13 g, in order better to illustrate the form of the pedal acceleration aP.

The pressure pulsation PN at the receiver cylinder consists mainly of two superposed harmonic vibrations having a frequency of 157 Hz and 235 Hz respectively (FIG. 13A), and also has superposed upon it the vibration at a frequency of approx. 3700 Hz, induced by the auxiliary vibrator in the liquid column (FIG. 13B), while the pressure pulsation PG at the transmitter cylinder consists substantially of high-frequency components having a frequency of approx. 3700 Hz (FIG. 13B). The vibratory system consisting of transmitter cylinder and clutch pedal cannot follow this high-frequency vibration, due to its inertia, so that it substantially remains at rest. As can be clearly seen from FIG. 11, with vibration suppression at the clutch pedal according to this invention, only marginal pedal accelerations aP could be measured, which are not detectable by the driver.

From FIG. 13A it can also be deduced that the auxiliary vibrator according to this invention also produces a clear reduction of the amplitude height of the vibration creating the undesired noise of, for example, 320 Hz to a maximum of 0.01 g.

As already described above, the comparative investigation was performed with an auxiliary vibrator, the diaphragm of which is so constructed that the ratio of its diameter to its thickness is greater than or equal to 45. If the vibrations in the region of approximately 300 and 500 Hz, that create the undesired noise, are to be strongly suppressed by the active principle underlying the invention, then the ratio of the diameter of the diaphragm to its thickness should be chosen smaller than 45. A diaphragm constructed smaller in this way possesses, in addition to a higher, although of lower energy intrinsic resonance, also a higher mechanical bursting strength and long-term strength.

A method for suppressing vibrations of an actuating element of a hydraulic force transmission apparatus, especially a hydraulic clutch actuation system, in an automobile, and an auxiliary vibrator for performing the method, are disclosed. The force transmission apparatus possesses a transmitter cylinder connected to the actuation element, and also a receiver cylinder connected to the transmitter cylinder via a liquid column, through which a low-frequency excitation vibration is transmitted to the liquid column, which propagates in the latter as low-frequency pressure pulsation. According to the invention, the low-frequency pressure pulsation excites the auxiliary vibrator provided in the liquid column in such a manner that the latter vibrates with its intrinsic frequency, which is higher than the frequency of the low-frequency pressure pulsation, so that the auxiliary vibrator induces in the liquid column a higher-frequency pressure pulsation, which the vibratory system consisting of transmitter cylinder and actuation element cannot follow. The auxiliary vibrator possesses a freely vibrating diaphragm, which is clamped in a housing, in order to form its bottom and/or top.

We claim:

1. A method of suppressing vibrations of an actuating element of a hydraulic force transmission apparatus which comprises a transmitter cylinder connected to an actuation element, which cylinder forms, together with the actuation element, a vibratory system, and also a receiver cylinder, connected via a liquid column to the transmitter cylinder, through which a low-frequency excitation vibration is transmitted to the liquid column, which propagates in the latter as low-frequency pressure pulsation characterized in that the low-frequency pressure pulsation excites an auxiliary vibrator, provided in the liquid column, in such a manner that the vibrator vibrates with its intrinsic frequency, which is higher than the low-frequency pressure pulsation, so that the auxiliary vibrator induces, in the liquid column, a high-frequency pressure pulsation, which the vibratory system consisting of transmitter cylinder and actuation element cannot follow.

2. An auxiliary vibrator for carrying out a method of suppressing vibrations of an actuating element of a hydraulic force transmission apparatus which comprises a transmitter cylinder connected to an actuation element, which cylinder forms, together with the actuation element, a vibratory system, and also a receiver cylinder, connected via a liquid column to the transmitter cylinder, through which a low-frequency excitation vibration is transmitted to the liquid column, which propagates in the latter as low-frequency pressure pulsation; the auxiliary vibrator comprising a housing, a base and/or top which is formed by a freely vibrating diaphragm, an edge of which is firmly clamped to the housing and which bounds, together with the housing, a chamber which can be connected via pipe connections to the transmitter cylinder and to the receiver cylinder of the hydraulic force transmission apparatus, so that the diaphragm can be loaded by the liquid column between transmitter cylinder and receiver cylinder, said housing being substantially annular or pot-shaped and said connections passing through an annular wall of the housing to the chamber, wherein the connection for the transmitter cylinder leads tangentially into the chamber, whereas the connection for the receiver cylinder leads radially into the chamber.

3. An auxiliary vibrator for carrying out a method of suppressing vibrations of an actuating element of a hydraulic force transmission apparatus which comprises a transmitter cylinder connected to an actuation element, which cylinder forms, together with the actuation element, a vibratory system, and also a receiver cylinder, connected via a liquid column to the transmitter cylinder, through which a low-frequency excitation vibration is transmitted to the liquid column, which propagates in the latter as low-frequency pressure pulsation; the auxiliary vibrator comprising a housing, a base and/or top which is formed by a freely vibrating diaphragm, an edge of which is firmly clamped to the housing and which bounds, together with the housing, a chamber which can be connected via pipe connections to the transmitter cylinder and to the receiver cylinder of the hydraulic force transmission apparatus, so that the diaphragm can be loaded by the liquid column between transmitter cylinder and receiver cylinder, said housing being substantially annular or pot-shaped and said connections passing through an annular wall of the housing to the chamber, said annular wall of the housing possessing a radially inwardly situated shoulder, against a side face of which the diaphragm is clamped by a ring, wherein the side face of the shoulder makes an acute angle with the internal circumferential surface of the housing, so that the diaphragm is clamped bulging outwards.

4. An auxiliary vibrator for carrying out a method of suppressing vibrations of an actuating element of a hydraulic force transmission apparatus which comprises a transmitter cylinder connected to an actuation element, which cylinder forms, together with the actuation element, a vibratory system, and also a receiver cylinder, connected via a liquid column to the transmitter cylinder, through which a low-frequency excitation vibration is transmitted to the liquid column, which propagates in the latter as low-frequency pressure pulsation; the auxiliary vibrator comprising a housing, a base and/or top which is formed by a freely vibrating diaphragm, an edge of which is firmly clamped to the housing and which bounds, together with the housing, a chamber which can be connected via pipe connections to the transmitter cylinder and to the receiver cylinder of the hydraulic force transmission apparatus, so that the diaphragm can be loaded by the liquid column between transmitter cylinder and receiver cylinder, said housing being substantially annular or pot-shaped and said connections passing through an annular wall of the housing to the chamber, said annular wall of the housing possessing a radially inwardly situated shoulder, against a side face of which the diaphragm is clamped by a ring, wherein the side face of the shoulder makes an obtuse angle with the internal circumferential surface of the housing, so that the diaphragm is clamped bulging inwards.

5. An auxiliary vibrator for carrying out a method of suppressing vibrations of an actuating element of a hydraulic force transmission apparatus which comprises a transmitter cylinder connected to an actuation element, which cylinder forms, together with the actuation element, a vibratory system, and also a receiver cylinder, connected via a liquid column to the transmitter cylinder, through which a low-frequency excitation vibration is transmitted to the liquid column, which propagates in the latter as low-frequency pressure pulsation; the auxiliary vibrator comprising a housing, a base and/or top which is formed by a freely vibrating diaphragm, an edge of which is firmly clamped to the housing and which bounds, together with the housing, a chamber which can be connected via pipe connections to the transmitter cylinder and to the receiver cylinder of the hydraulic force transmission apparatus, so that the diaphragm can be loaded by the liquid column between transmitter cylinder and receiver cylinder, said housing being substantially annular or pot-shaped and said connections passing through an annular wall of the housing to the chamber, wherein the ratio of the diameter of the chamber to the depth of the chamber is greater than or equal to 1.5, and the ratio of the diameter of the diaphragm to the thickness of the diaphragm is greater than or equal to 45.

\* \* \* \* \*